(12) United States Patent
Zhou et al.

(10) Patent No.: US 11,915,663 B2
(45) Date of Patent: Feb. 27, 2024

(54) COMMON VOLTAGE DRIVING CIRCUIT, DISPLAY DEVICE, AND ELECTRONIC DEVICE

(71) Applicant: HKC Corporation Limited, Guangdong (CN)

(72) Inventors: Mancheng Zhou, Guangdong (CN); Yuanping Zhang, Guangdong (CN); Rongrong Li, Guangdong (CN)

(73) Assignee: HKC CORPORATION LIMITED, Guangdong (CN)

( * ) Notice: Subject to any disclaimer, the term of this patent is extended or adjusted under 35 U.S.C. 154(b) by 0 days.

(21) Appl. No.: 18/090,706

(22) Filed: Dec. 29, 2022

(65) Prior Publication Data

US 2023/0377527 A1 Nov. 23, 2023

(30) Foreign Application Priority Data

May 19, 2022 (CN) .......................... 202210547324.1

(51) Int. Cl.
G09G 3/34 (2006.01)
G02F 1/1679 (2019.01)
G02F 1/16766 (2019.01)

(52) U.S. Cl.
CPC ......... *G09G 3/3446* (2013.01); *G02F 1/1679* (2019.01); *G02F 1/16766* (2019.01);
(Continued)

(58) Field of Classification Search
CPC .......... G09G 3/344; G09G 2300/0426; G09G 3/3446; G09G 3/3655; G02F 1/16757;
(Continued)

(56) References Cited

U.S. PATENT DOCUMENTS

2010/0207924 A1* 8/2010 Saito ...................... G09G 3/344
345/107

FOREIGN PATENT DOCUMENTS

CN 101866236 A 10/2010
CN 105301858 A 2/2016
(Continued)

OTHER PUBLICATIONS

Notice of Opinion for the First Review dated Feb. 2, 2023 received in Chinese Patent Application No. CN 202210547324.1.
(Continued)

*Primary Examiner* — Sanjiv D. Patel
(74) *Attorney, Agent, or Firm* — Scully, Scott, Murphy & Presser, P.C.

(57) ABSTRACT

A common voltage driving circuit, a display device, and an electronic device are provided. The common voltage driving circuit includes multiple scan lines and multiple common-voltage signal lines, and further includes multiple common electrode units arranged in an array. The multiple scan lines extend in a first direction and are arranged at intervals in sequence in a second direction perpendicular to the first direction. The multiple common-voltage signal lines extend in the second direction and are arranged at intervals in sequence in the first direction. The multiple common electrode units are disposed at intersections of the multiple scan lines and the multiple common-voltage signal lines respectively. Common electrode units in a same column are all electrically coupled with a same common-voltage signal line. Common electrode units in a same row are all electrically coupled with a same second scan line.

16 Claims, 4 Drawing Sheets

(52) U.S. Cl.
CPC . *G09G 2300/08* (2013.01); *G09G 2300/0842* (2013.01); *G09G 2310/0267* (2013.01)

(58) Field of Classification Search
CPC .................. G02F 1/167; G02F 1/1685; G02F 2001/1678; G02F 1/1681; G02F 1/13306; G02F 1/1679; G02F 1/1676; G02F 2201/121
See application file for complete search history.

(56) References Cited

FOREIGN PATENT DOCUMENTS

| CN | 105467639 | A |   | 4/2016  |           |
|----|-----------|---|---|---------|-----------|
| CN | 105527738 | A |   | 4/2016  |           |
| CN | 105629609 | A |   | 6/2016  |           |
| CN | 105633093 | A |   | 6/2016  |           |
| CN | 206450919 | U | * | 8/2017  | G02F 1/13338 |
| CN | 107255895 | A |   | 10/2017 |           |
| CN | 107331342 |   | * | 11/2017 | G09G 3/20 |
| CN | 107331342 | A |   | 11/2017 |           |
| CN | 107463035 | A |   | 12/2017 |           |
| CN | 108648702 | A |   | 10/2018 |           |
| CN | 109164611 | A |   | 1/2019  |           |
| CN | 109917966 | A |   | 6/2019  |           |
| CN | 110520791 | A |   | 11/2019 |           |
| CN | 110930959 | A |   | 3/2020  |           |
| CN | 113966113 | A |   | 1/2022  |           |
| KR | 101640816 | B1| * | 7/2016  | G02F 1/167 |

OTHER PUBLICATIONS

Second Office Action dated Mar. 29, 2023 received in Chinese Patent Application No. CN 202210547324.1.

* cited by examiner

COMMON VOLTAGE DRIVING CIRCUIT, DISPLAY DEVICE, AND ELECTRONIC DEVICE

CROSS-REFERENCE TO RELATED APPLICATIONS

This application claims priority under 35 U.S.C. § 119(a) to Chinese Patent Application No. 202210547324.1, filed May 19, 2022, the entire disclosure of which is incorporated herein by reference.

TECHNICAL FIELD

This disclosure relates to the field of display technology, and in particular to a common voltage driving circuit, a display device, and an electronic device.

BACKGROUND

Electronic papers are new types of display devices, and mainly applicable to electronic labels, billboards, electronic readers, and other electronic display devices. Regarding a display effect, an electronic paper is close to a natural paper, which can relieve visual fatigue during reading. The electronic paper generally includes a display panel and a driving module. The driving module is used to drive the display panel to display an image according to image data. The display panel includes common electrodes.

However, in an existing display panel, the common electrodes are a whole. In other words, common voltages of an entire display panel are shared, such that a common voltage of each region of the display panel is unable to be controlled independently.

SUMMARY

A common voltage driving circuit is provided in the present disclosure. The common voltage driving circuit includes multiple scan lines and multiple common-voltage signal lines, and further includes multiple common electrode units arranged in an array. The multiple scan lines extend in a first direction and are arranged at intervals in sequence in a second direction perpendicular to the first direction. The multiple common-voltage signal lines extend in the second direction and are arranged at intervals in sequence in the first direction. The multiple common electrode units are disposed at intersections of the multiple scan lines and the multiple common-voltage signal lines respectively. Common electrode units in a same column are all electrically coupled with a same common-voltage signal line. Common electrode units in a same row are all electrically coupled with a same second scan line. The multiple common electrode units are configured to independently control a common electrode voltage of a display device in units of sub-pixels.

A display device is further provided in the present disclosure. The display device includes a display panel and a driving module electrically coupled with the display panel. The display panel includes a common voltage driving circuit. The common voltage driving circuit includes multiple scan lines and multiple common-voltage signal lines, and further includes multiple common electrode units arranged in an array. The multiple scan lines extend in a first direction and are arranged at intervals in sequence in a second direction perpendicular to the first direction. The multiple common-voltage signal lines extend in the second direction and are arranged at intervals in sequence in the first direction. The multiple common electrode units are disposed at intersections of the multiple scan lines and the multiple common-voltage signal lines respectively. Common electrode units in a same column are all electrically coupled with a same common-voltage signal line. Common electrode units in a same row are all electrically coupled with a same second scan line. The multiple common electrode units are configured to independently control a common electrode voltage of a display device in units of sub-pixels.

An electrode device is further provided in the present disclosure. The electronic device includes a power supply unit, a housing, and a display device. The display device includes a display panel and a driving module electrically coupled with the display panel. The display panel includes a common voltage driving circuit. The common voltage driving circuit includes multiple scan lines and multiple common-voltage signal lines, and further includes multiple common electrode units arranged in an array. The multiple scan lines extend in a first direction and are arranged at intervals in sequence in a second direction perpendicular to the first direction. The multiple common-voltage signal lines extend in the second direction and are arranged at intervals in sequence in the first direction. The multiple common electrode units are disposed at intersections of the multiple scan lines and the multiple common-voltage signal lines respectively. Common electrode units in a same column are all electrically coupled with a same common-voltage signal line. Common electrode units in a same row are all electrically coupled with a same second scan line. The multiple common electrode units are configured to independently control a common electrode voltage of a display device in units of sub-pixels. The power supply unit and the display device are mounted on the housing. The power supply unit is electrically coupled with the display device. The power supply unit is configured to provide power for the display device.

BRIEF DESCRIPTION OF THE DRAWINGS

In order to explain technical solutions in implementations of the present disclosure more clearly, the following will give a brief introduction to accompanying drawings which are needed to be used in description of implementations or the related art. Apparently, the accompanying drawings in the following description are some implementations of the present disclosure. For those of ordinary skill in the art, other accompanying drawings can be obtained according to these accompanying drawings without creative efforts.

DETAILED DESCRIPTION

Figure 1:
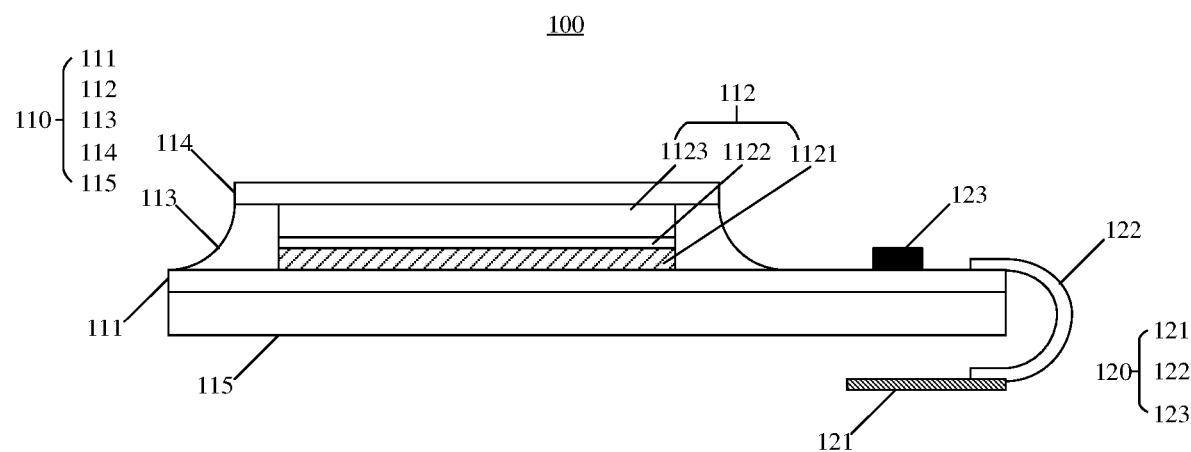
FIG. 1 is a schematic structural diagram of a display device provided in implementations of the present disclosure.

In order to facilitate understanding of the present disclosure, a comprehensive description will be given below with reference to related accompanying drawings. The accompanying drawings illustrate some exemplary implementations of the present disclosure. However, the present disclosure can be implemented in many different forms and is not limited to implementations described herein. On the contrary, these implementations are provided for a more thorough and comprehensive understanding of the present disclosure.

The following implementations are described with reference to accompanying drawings to illustrate particular implementations in which the present disclosure may be implemented. The serial numbers assigned herein for the components themselves, such as "first", "second", etc., are only used to distinguish between objects described and do not have any sequential or technical meaning. The "connection" and "coupling" in the present disclosure, unless otherwise specified, include direct and indirect connection (coupling). Direction terms mentioned in the present disclosure, such as "up", "down", "front", "back", "left", "right", "inside", "outside", "side surface", etc., are only directions with reference to the directions of the accompanying drawings. Therefore, the direction terms are used for better and clearer illustration and understanding of the present disclosure, and are not intended to indicate or imply that the device or component must have a specific orientation, be constructed and operated in the particular orientation, and therefore cannot be construed as limiting to the present disclosure.

In the description of the present disclosure, it should be noted that unless otherwise expressly specified or defined, terms such as "disposed", "arranged", "provided with", "mount", "couple", and "connect" should be understood broadly, and for example, a fixed connection, or a detachable connection, or an integrated connection; may be a mechanical connection; and may be a direct connection, or an indirect connection via an intermediate medium, or may be an internal communication between two components. The specific meanings of the above-mentioned terms in the present disclosure could be understood by those of ordinary skill in the art according to specific situations. It should be noted that the terms "first", "second", etc. in the specification, claims and accompanying drawings of the present disclosure are used to distinguish different objects, rather than to describe a specific order.

In addition, terms "comprise", "may comprise", "include", or "may include" used in the present disclosure indicate the existence of corresponding functions, operations, components, etc., which are disclosed, and do not limit one or more other functions, operations, components, etc. Moreover, the terms "comprise" or "include" indicate the existence of corresponding features, numbers, steps, operations, elements, components, or combinations thereof disclosed in the specification, and do not exclude the existence or addition of one or more other features, numbers, steps, operations, elements, components, or combinations thereof, with the intent of covering non-exclusive inclusion. Furthermore, when describing implementations of the present disclosure, "may" is used to mean "one or more implementations of the present disclosure". Also, the term "exemplary" is intended to refer to examples or illustrations.

Unless otherwise defined, all technical and scientific terms used herein have the same meaning as commonly understood by those skilled in the art of the present disclosure. The terms used herein in the specification of the present disclosure are for the purpose of describing specific implementations only and are not intended to limit the present disclosure.

The present disclosure hopes to provide a technical solution which can solve the above technical problem and includes a common voltage driving circuit, a display device, and an electronic device, such that a common voltage of each region of the display panel can be controlled independently, thereby realizing a batter compatibility effect of a display screen, details of which will be described in subsequent implementations.

Reference can be made to FIG. 1, which is a schematic structural diagram of a display device provided in implementations of the present disclosure. In implementations, a display device 100 includes a display panel 110 and a driving module 120. The driving module 120 is electrically coupled with the display panel 100 and is configured to drive the display panel 110 to display an image.

In implementations of the present disclosure, the display panel 110 may at least include a substrate 111, a Front Plane Laminate (FPL) 112, a sealant 113, a common voltage driving circuit 114, and a support 115. The substrate 111 is disposed at one side of the support body 115. The FPL 112 is disposed at one side of the substrate 111 away from the support 115. The common voltage driving circuit 114 is disposed at one side of the FPL 112 away from the substrate 111. The sealant 113 is disposed between the substrate 111 and the common voltage driving circuit 114, is disposed around a peripheral side of the FPL 112, and is configured to isolate water vapor in an environment from penetrating into the FPL 112. In other words, the sealant 113 is located between the substrate 111 and the common voltage driving circuit 114, such that the sealant 113, the substrate 111, and the common voltage driving circuit 114 cooperatively define an accommodation space, and the FPL 112 is located in the accommodation space.

In implementations, the substrate 111 may be a Thin Film Transistor (TFT) backplane, and the sealant 113 may be an edge seal.

In implementations, the FPL 112 may at least include a TFT trace layer 1121, a pixel electrode layer 1122, and an electronic ink layer 1123 which are stacked in sequence. The TFT trace layer 1121 is disposed at one side of the substrate 111 away from the support 115. The pixel electrode layer 1122 is disposed at one side of the TFT trace layer 1121 away from the substrate 111. The electronic ink layer 1123 is disposed at one side of the pixel electrode layer 1122 away from the TFT trace layer 1121. In other words, the pixel electrode layer 1122 is located between the TFT trace layer 1121 and the electronic ink layer 1123. The electronic ink layer 1123 is filled between the common voltage driving circuit 114 and the pixel electrode layer 1122, and the electronic ink layer 1123 is composed of a large number of micro liquid capsules with an extremely small size.

In implementations, the pixel electrode layer 1122 may be an Indium Tin Oxide (ITO) layer, and the electronic ink layer 1123 may include a transparent dispersion medium.

In implementations, the driving module 120 may at least include a circuit driving board 121, a transmission board 122, and a driving unit 123. The driving unit 123 is disposed at one side of the substrate 111 away from the support 115 and is electrically coupled with the display panel 110. The circuit driving board 121 is electrically coupled with the driving unit 123 through the transmission board 122 and is configured to transmit a driving signal to the driving unit 123. The driving signal is output by the circuit driving board 121.

It can be understood that the driving unit 123 can provide a data signal, a scan signal, and other voltage control signals for the display panel 110.

In implementations, the circuit driving board 121 may be a system circuit board. The transmission board 122 may be a Flexible Printed Circuit (FPC). The driving unit 123 may include at least one driver integrated circuit (IC).

It can be understood that the display device 100 may be a device that uses an electronic ink for display. For example, the display device 100 may be an electronic paper and can be applicable to a conventional display device, display screens of a handheld-device such as a Personal Digital Assistant (PDA) and mobile communication, an ultra-thin display, and other electronic devices.

Figure 2:
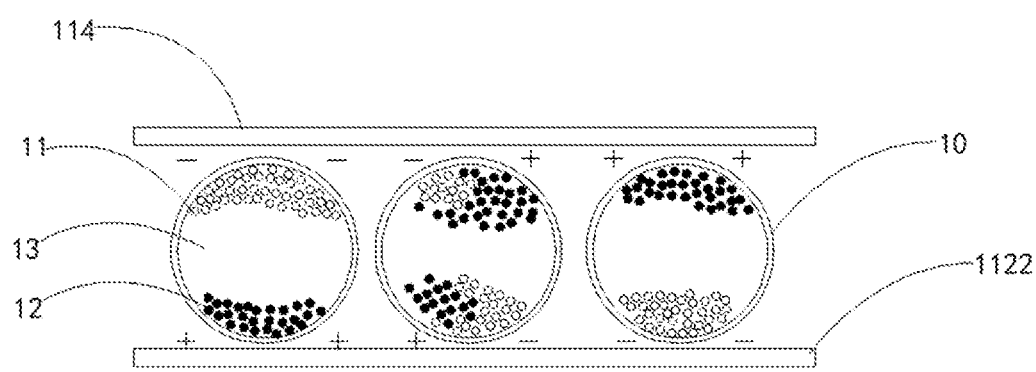
FIG. 2 is a schematic diagram illustrating an operation principle of a display panel in FIG. 1.

Reference can be made to FIG. 2, which is a schematic diagram illustrating an operation principle of a display panel in FIG. 1. As illustrated in FIG. 2, multiple micro liquid capsules 10 are disposed between the pixel electrode layer 1122 and the common voltage driving circuit 114, that is, the electronic ink layer 1123 includes the multiple micro liquid capsules 10. A micro liquid capsule 10 is a sealed sphere, and multiple white particles 11, multiple black particles 12 and a transparent dispersion medium 13 are encapsulated inside the micro liquid capsule 10. A white particle 11 and a black particle 12 are respectively two kinds of particles with different electric charges. In other words, the white particle 11 is charged in positive and the black particles 12 is charged in negative, or the white particle 11 is charged in negative and the black particle 12 is charged in positive. In implementations of the present disclosure, for example, the white particles 11 is charged in positive and the black particles 12 is charged in negative. The white particle 11 and the black particle 12 are completely immersed in the transparent dispersion medium 13 and can move freely in the transparent dispersion medium 13. When an electric field is defined between the pixel electrode layer 1122 and the common voltage driving circuit 114 at two ends of the micro liquid capsule 10, the white particle 11 and the black particle 12 move correspondingly under an action of an electric field force, such that one side of the micro liquid capsule 10 close to the common voltage driving circuit 114 will appear black or white to a certain extent, thereby presenting a clear black-and-white visual effect. Finally, a preset image is formed at one side close to the common voltage driving circuit 114 through the micro liquid capsules 10.

In implementations of the present disclosure, for example, the white particle 11 is charged in positive and the black particle 12 is charged in negative.

Figure 3:
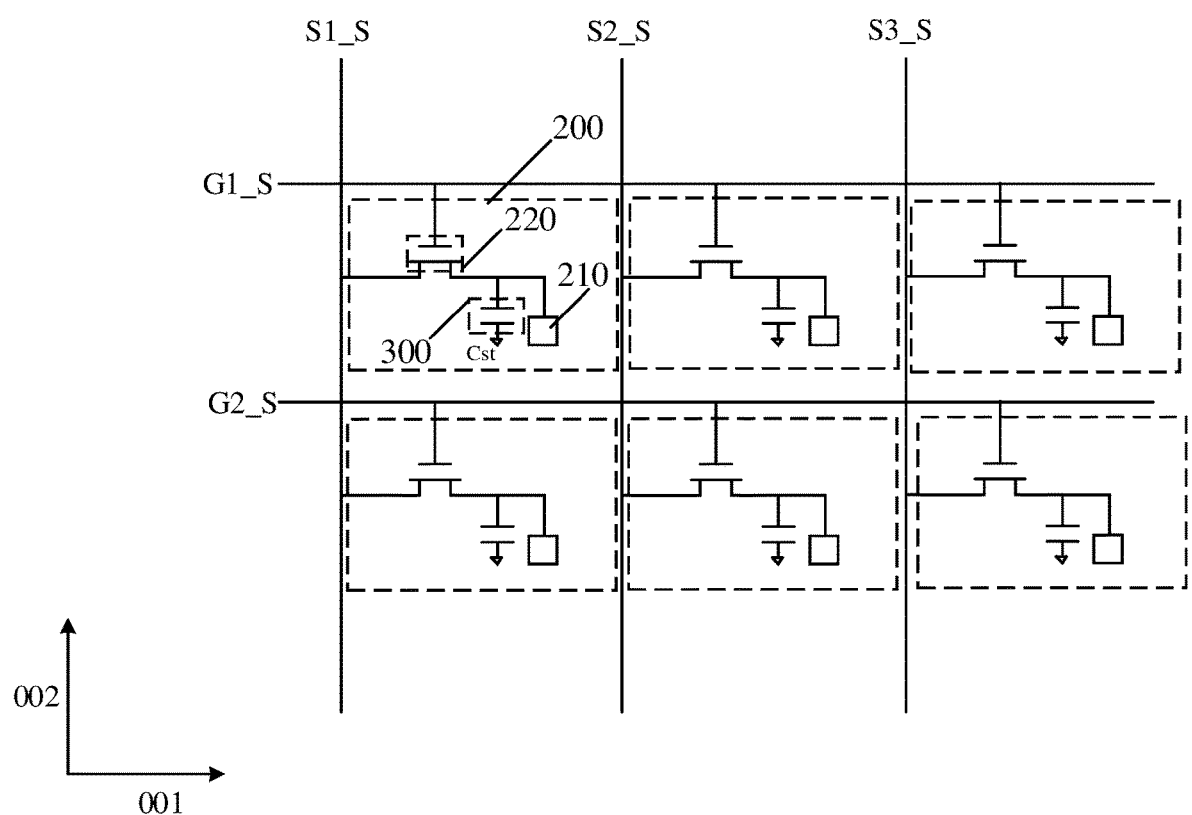
FIG. 3 is a schematic diagram illustrating a circuit structure of a Thin Film Transistor (TFT) trace layer in FIG. 1.

Reference can be made to FIG. 3, which is a schematic diagram illustrating a circuit structure of a TFT trace layer in FIG. 1. As illustrated in FIG. 3, in the TFT trace layer 1121, multiple first scan lines (i.e., Gate line) Gn_S (n=1, 2, ..., n) extend in first direction 001 and are arranged at intervals in sequence in second direction 002. Multiple data lines (i.e., Source line) Sm_S (m=1, 2, ..., m) extend in second direction 002 and are arranged at intervals in sequence in first direction 001. Pixel units 200 are disposed at intersections of the multiple first scan lines and the multiple data lines respectively. Specifically, a pixel unit 200 is disposed between any two adjacent first scan lines and any two adjacent data lines. Multiple pixel units 200 are arranged in a matrix. First direction 001 and second direction 002 are perpendicular to each other, and the multiple first scan lines, the multiple data lines, and the multiple first scan lines and the multiple data lines are insulated from one another. In other words, the multiple first scan lines are arranged at intervals and insulated from one another, the multiple data lines are arranged at intervals and insulated from one another, and the multiple first scan lines and the multiple data lines are insulated from one another.

In implementations of the present disclosure, the pixel unit 200 is configured to control a corresponding micro liquid capsule 10. Each pixel unit 200 includes a TFT 220, a pixel electrode 210, and a storage capacitor 300. The TFT 220 has a gate electrically coupled with a first scan line, a source electrically coupled with a data line, and a drain electrically coupled with the pixel electrode 210 and one end of the storage capacitor 300. Another end of the storage capacitor 300 is electrically coupled with reference electrode Cst.

For example, regarding first scan line in a first row G1_S, when first scan line in the first row G1_S is at a high level, TFTs 220 in the first row are turned on, and data signals are transmitted to pixel electrodes 210 in the first row through first data line S1_S, second data line S2_S, and third data line S3_S. In this case, an electric field is defined between the pixel electrodes 210 in the first row and the common voltage driving circuit 114, such that colors of micro liquid capsules 10 corresponding to the pixel electrodes 210 in the first row are controlled to change.

When first scan line in the first row G1_S is at a low level, the TFTs 220 in the first row are turned off, and storage capacitors 300 temporarily maintain voltages of the pixel electrodes 210.

Figure 4:
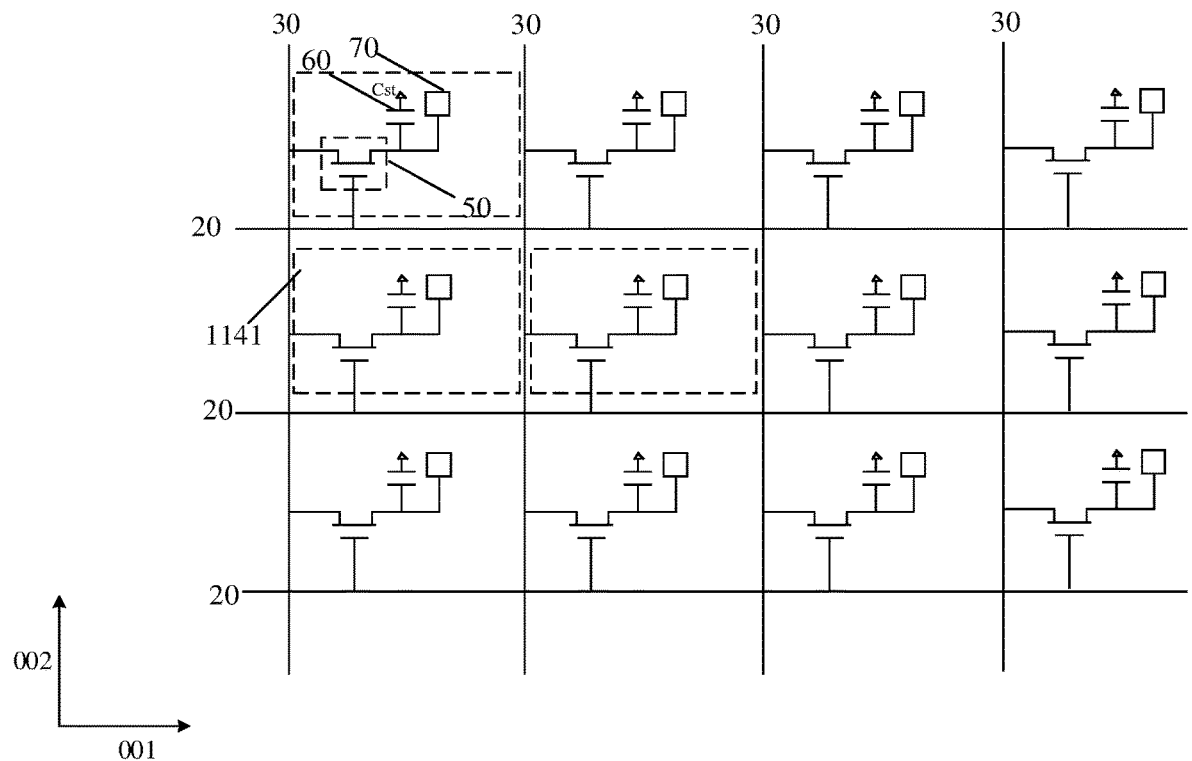
FIG. 4 is a schematic diagram illustrating a circuit structure of a common voltage driving circuit in FIG. 1.

Reference can be made to FIG. 4, which is a schematic diagram illustrating a circuit structure of a common voltage driving circuit in FIG. 1. As illustrated in FIG. 4, the common voltage driving circuit 114 includes multiple second scan lines 20, multiple common electrode units 1141, and multiple common-voltage signal lines 30. The multiple second scan lines 20 are all disposed at corresponding positions in the common voltage driving circuit 114. The multiple second scan lines 20 extend in first direction 001 and are arranged in the common voltage driving circuit 114 at intervals in sequence in parallel in second direction 002. The multiple common-voltage signal lines 30 are all disposed at corresponding positions in the common voltage driving circuit 114. The multiple common-voltage signal lines 30 extend in second direction 002 and are arranged in the common voltage driving circuit 114 at intervals in sequence in parallel in first direction 001.

The multiple common electrode units 1141 are disposed at intersections of the multiple second scan lines 20 and the multiple common-voltage signal lines 30 respectively. Specifically, a common electrode unit 1141 is disposed between any two adjacent second scan lines 20 and any two adjacent common-voltage signal lines 30. The multiple common electrode units 1141 are arranged in a matrix. The multiple second scan lines 20, the multiple common-voltage signal lines 30, and the multiple second scan lines 20 and the multiple common-voltage signal line 30 are insulated from one another. In other words, the multiple second scan lines 20 are arranged at intervals and insulated from one another, the multiple common-voltage signal lines 30 are arranged at intervals and insulated from one another, and the multiple second scan lines 20 and the multiple common-voltage signal lines 30 are insulated from one another. Therefore, in the common voltage driving circuit 114, a common electrode voltage can be controlled in minimum units of sub-pixels, such that the common electrode unit 1141 can be adjusted independently in real time.

In implementations of the present disclosure, in order to facilitate description of an arrangement mode of the common electrode units 1141 in the common voltage driving circuit 114, 4*3 common electrode units 1141 being arranged in a matrix are taken as an example. In other words, the common voltage driving circuit 114 includes 12 common electrode units 1141, where common electrode units 1141 in the same column are all electrically coupled with the same common-voltage signal line 30, and common electrode units 1141 in the same row are all electrically coupled with the same second scan line 20. It can be understood that the above illustrations are only for describing specific implementations and therefore cannot be construed as a limitation to the present disclosure.

The multiple common electrode units 1141 are disposed in the common voltage driving circuit 114. The common electrode units 1141 each include a driving transistor 50, a capacitor 60, and a common electrode 70. The driving transistor 50 has a gate for receiving scan signal Gn (n=1, 2, . . . , n), a source for receiving common voltage signal Sm (m=1, 2, . . . , m), and a drain electrically coupled with a first end of the capacitor 60 and the common electrode 70. A second end of the capacitor 60 is electrically coupled with reference electrode Cst. The capacitor 60 is configured to maintain a voltage of the common electrode 70. When scan signal Gn is a high-level signal, the driving transistor 50 is turned on, and common voltage signal Sm is written into the first end of the capacitor 60 and the common electrode 70 through the driving transistor 50.

In implementations of the present disclosure, the driving transistor 50 may be a TFT, so the common electrode 70 can be controlled by using the TFT. The capacitor 60 may be a storage capacitor.

Figure 5:
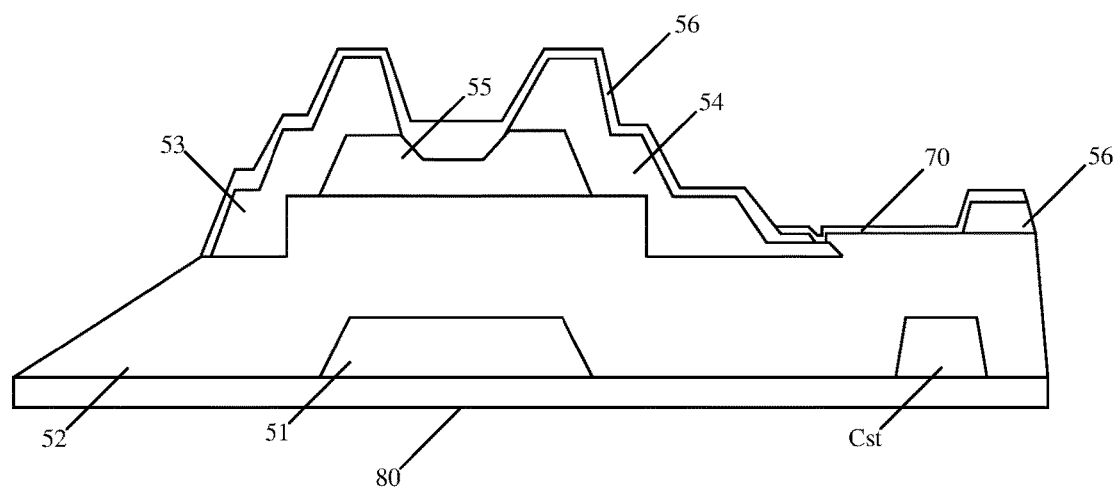
FIG. 5 is a schematic diagram illustrating a specific structure of a common electrode unit in FIG. 4.

Reference can be made to FIG. 5, which is a schematic diagram illustrating a specific structure of a common electrode unit in FIG. 4. As illustrated in FIG. 5, the common electrode unit 1141 may at least include a gate 51 of the driving transistor 50, reference electrode Cst, an insulating layer 52, a drain 53 of the driving transistor 50, a source 54 of the driving transistor 50, a channel 55, a passivation layer 56, and a common electrode 70.

In implementations of the present disclosure, the gate 51 of the driving transistor 50 is disposed on the base substrate 80. Reference electrode Cst is disposed on the base substrate 80 and disposed at one side of the gate 51 of the driving transistor 50. In implementations of the present disclosure, a material of reference electrode Cst may be an aluminum-plated or molybdenum-plated conductor, and a material of the gate 51 of the driving transistor 50 may be an aluminum-plated or molybdenum-plated conductor.

In implementations of the present disclosure, the insulating layer 52 is stacked on the base substrate 80, and covers the gate 51 and reference electrode Cst which are on the base substrate 80. Specifically, part of the insulating layer 52 is disposed on the gate 51 of the driving transistor 50, another part of the insulating layer 52 is disposed on reference electrode Cst, and the rest of the insulating layer 52 is disposed on the base substrate 80, such that the gate 51 of the driving transistor 50 is isolated from the drain 53 of the driving transistor 50, and the gate 51 of the driving transistor 50 is isolated from the source 54 of the driving transistor 50, thereby making the gate 51 of the driving transistor 50 not conducted with the drain 53 of the driving transistor 50, and the gate 51 of the driving transistor 50 not conducted with the source 54 of the driving transistor 50. In implementations of the present disclosure, a material of the insulating layer 52 may be silicon nitride.

In implementations of the present disclosure, the channel 55 is disposed at one side of the insulating layer 52 away from the gate 51 of the driving transistor 50, and a position of the channel 55 corresponds to a position of the gate 51. In other words, the channel 55 and the gate 51 are located at two opposite sides of the insulating layer 52 respectively and correspond in position, such that the drain 53 of the driving transistor 50 can be conducted with the source 54 of the driving transistor 50. In implementations of the present disclosure, a material of the channel 55 may be silicon with a high concentration of phosphorus (e.g., phosphine ($PH_3$)).

In implementations of the present disclosure, the drain 53 of the driving transistor 50 is stacked on the insulating layer 52 and covers part of the channel 55 located on the insulating layer 52. Specifically, one part of the drain 53 of the driving transistor 50 is disposed on the insulating layer 52, and the other part of the drain 53 is disposed on the channel 55. In implementations of the present disclosure, a material of the drain 53 of the driving transistor 50 may be aluminum or molybdenum.

In implementations of the present disclosure, the source 54 of the driving transistor 50 is stacked on the insulating layer 52 and covers part of the channel 55 located on the insulating layer 52. Specifically, one part of the source 54 of the driving transistor 50 is disposed on the insulating layer 52, and the other part of the source 54 is disposed on the channel 55. In implementations of the present disclosure, a material of the source 54 of the driving transistor 50 may be aluminum or molybdenum.

In implementations of the present disclosure, the passivation layer 56 is stacked on the drain 53 of the driving transistor 50, the source 54 of the driving transistor 50, and the channel 55, and covers part of the insulating layer 52 corresponding to reference electrode Cst. Specifically, part of the passivation layer 56 is disposed on the drain 53 of the driving transistor 50, another part of the passivation layer 56 is disposed on the channel 55, yet another part of the passivation layer 56 is disposed on the source 54 of the driving transistor 50, and the rest of the passivation layer 56 is disposed on the part of the insulating layer 52 corresponding to reference electrode Cst, such that the drain 53 of the driving transistor 50 and the source 54 of the driving transistor 50 can be protected. In implementations of the present disclosure, a material of the passivation layer 56 may be silicon nitride.

In implementations of the present disclosure, the common electrode 70 is stacked on part of the passivation layer 56 corresponding to reference electrode Cst and part of the insulating layer 52 corresponding to reference electrode Cst, and covers one end of the passivation layer 56 close to reference electrode Cst and one end of the source 54 close to reference electrode Cst. Specifically, part of the common electrode 70 is disposed on the passivation layer 56 corresponding to reference electrode Cst, another part of the common electrode 70 is disposed on the insulating layer 52 corresponding to reference electrode Cst, and the rest of the common electrode 70 is disposed on the end of the source 54 of the driving transistor 50 close to reference electrode Cst and the end of the passivation layer 56 close to reference electrode Cst. In implementations of the present disclosure, a material of the common electrode 70 may be ITO.

Figure 6:
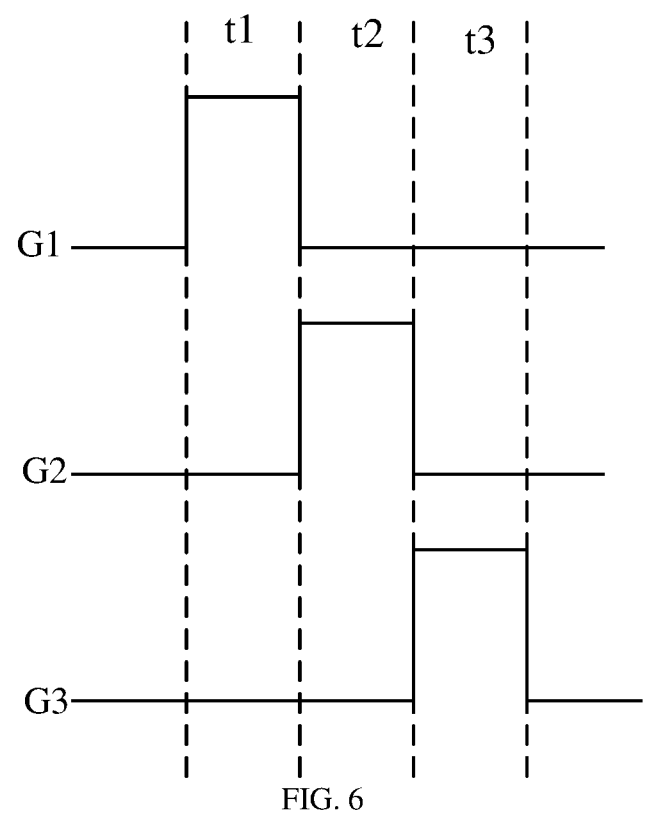
FIG. 6 is a sequence diagram of the common voltage driving circuit in FIG. 4.

Reference can be made to FIG. 6, which is a sequence diagram of the common voltage driving circuit in FIG. 4. Specifically, three stages of t1, t2, and t3 in the sequence diagram illustrated in FIG. 6 are selected. Reference can be made to FIG. 4 and FIG. 6 together, details of the sequence diagram of the common voltage driving circuit 114 illustrated in FIG. 6 will be explained in subsequent implementations.

Specifically, 1 denotes a high potential and 0 denotes a low potential. It should be noted that 1 and 0 are logic potentials, which are only used to better explain a specific operation process of implementations of the present disclosure, and do not denote potentials applied to a gate of each transistor in a specific implementation process. In implementations, since the driving transistor 50 is an N-type transistor, an effective signal is a high-level signal.

At stage t1, first scan signal G1=1, second scan signal G2=0, and third scan signal G3=0.

When first scan signal G1 is a high-level signal, and second scan signal G2 and third scan signal G3 each are a low-level signal, driving transistors 50 in a first row are turned on, common voltage signals Sm are transmitted to corresponding capacitors 60 and corresponding common electrodes 70 in common electrode units 1141 in the first row, and driving transistors 50 in a second row and driving transistors 50 in a third row each are turned off.

At stage t2, first scan signal G1=0, second scan signal G2=1, and third scan signal G3=0.

When first scan signal G1 is the low-level signal, second scan signal G2 is the high-level signal, and third scan signal G3 is the low-level signal, the driving transistors 50 in the second row are turned on, common voltage signals Sm are transmitted to corresponding capacitors 60 and corresponding common electrodes 70 in the common electrode units 1141 in the second row, and the driving transistors 50 in the first row and the driving transistors 50 in the third row each are turned off.

At stage t3, first scan signal G1=0, second scan signal G2=0, and third scan signal G3=1.

When first scan signal G1 and second scan signal G2 each are the low-level signal, and third scan signal G3 is the high-level signal, the driving transistors 50 in the third row are turned on, common voltage signals Sm are transmitted to corresponding capacitors 60 and corresponding common electrodes 70 in the common electrode units 1141 in the third row, and the driving transistors 50 in the first row and the driving transistors 50 in the second row each are turned off.

To sum up, in the common voltage driving circuit and the display device in the present disclosure, common electrodes are divided into the multiple common electrode units 1141 that can be controlled independently, the multiple common electrode units 1141 each include the driving transistor 50, the capacitor 60, and the common electrode 70, and a voltage of the common electrode 70 is controlled independently through the driving transistor 50, such that a common voltage of each region on the display device can be adjusted independently in real time, thereby making the display device have a stronger coping ability, a better compatibility effect, and a better display quality.

Figure 7:
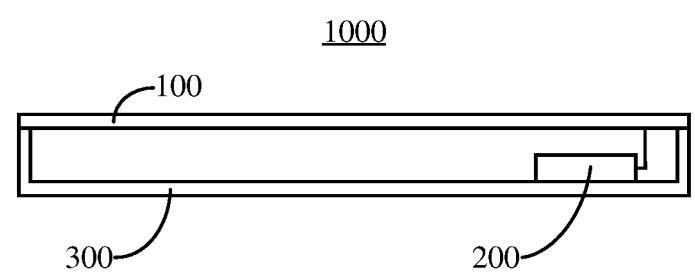
FIG. 7 is a schematic cross-sectional diagram of an electronic device provided in implementations of the present disclosure.

Based on the same inventive concept, an electronic device is further provided in the present disclosure. Reference can be made to FIG. 7, which is a schematic cross-sectional diagram of an electronic device provided in implementations of the present disclosure. An electronic device 1000 at least includes a power supply unit 200, a housing 300, and the display device 100 illustrated in the above implementations. The power supply unit 200 and the display device 100 are mounted on the housing 300. The power supply unit 200 is electrically coupled with the display device 100. The power supply unit 200 is configured to provide power for the display device 100. The display device 100 has been described in detail in implementations illustrated in FIG. 1 to FIG. 5, so a structure and an operation principle of the display device 100 are the same as the structure and the operation principle of the display device 100 in the above implementations, and will not be repeated here. The electronic devices 1000 include but are not limited to a conventional display device, a handheld device such as mobile communication and a PDA, and any electronic devices or components with the display device such as an ultra-thin display, which are not specifically limited in the present disclosure. Specifically, for example, the electronic devices may be an electronic-paper watch, an electronic-paper book, an e-book reader, an electronic-paper schoolbag, an electronic-paper billboard, an electronic-paper label, an electronic bank card, an electronic-paper bus card, and other related electronic products.

The flow chart illustrated in the present disclosure is merely an implementation, and there may be various modifications and changes of the steps in the figures or the present disclosure without departing from the spirit of the present disclosure. For example, the steps may be performed in different orders, or certain steps can be added, deleted, or modified. Those of ordinary skill in the field can understand and realize all or a part of the process of the above implementations, and the equivalent changes made in accordance with the claims of the present disclosure still belong to the scope of the present disclosure covered.

The reference term "an implementation", "some implementations", "an exemplary implementation", "an embodiment", "a specific embodiment", or "some embodiments" referred to herein means that a particular feature, structure, material, or characteristic described in conjunction with implementations or embodiments may be contained in at least one implementation or embodiment of the present disclosure. The exemplary expressions of the above terms appearing in the specification does not necessarily refer to the same implementation or embodiment. Furthermore, the particular feature, structure, material, or characteristic described may be properly combined in any one or more implementations or embodiments.

It should be understood that the application of the present disclosure is not limited to the above examples, and for those of ordinary skill in the art, improvements or modifications can be made according to the above descriptions, and all such improvements and modifications shall fall within the protection scope of the appended claims of the present disclosure. Those of ordinary skill in the art can understand all or part of methods for implementing the above implementations, and equivalent changes made according to the claims of the present disclosure still fall within the scope of the present disclosure.

What is claimed is:

1. A common voltage driving circuit comprising a plurality of scan lines and a plurality of common-voltage signal lines, and further comprising a plurality of common electrode units arranged in an array, wherein the plurality of scan lines extend in a first direction and are arranged at intervals in sequence in a second direction perpendicular to the first direction, the plurality of common-voltage signal lines extend in the second direction and are arranged at intervals in sequence in the first direction, the plurality of common electrode units are disposed at intersections of the plurality of scan lines and the plurality of common-voltage signal lines respectively, common electrode units in a same column are all electrically coupled with a same common-voltage signal line, common electrode units in a same row are all electrically coupled with a same second scan line, and the plurality of common electrode units are configured to independently control a common electrode voltage of a display device in units of sub-pixels;

the plurality of common electrode units each comprise a driving transistor, a capacitor, a reference electrode, and a common electrode, wherein the driving transistor has a gate for receiving a scan signal, a source for receiving a common voltage signal, and a drain electrically coupled with a first end of the capacitor and the common electrode, a second end of the capacitor is electrically coupled with the reference electrode, and the capacitor is configured to maintain a voltage of the common electrode; and the plurality of common electrode units each further comprise an insulating layer, a channel, and a passivation layer, wherein the insulating layer is stacked on a base substrate, and covers the gate and the reference electrode which are on the base substrate, the channel is disposed at one side of the insulating layer away from the gate of the driving transistor, a position of the channel corresponds to a position of the gate, and the passivation layer is stacked on the drain, the source, and the channel, and covers part of the insulating layer corresponding to the reference electrode.

2. The common voltage driving circuit of claim 1, wherein the driving transistor is a Thin Film Transistor (TFT), and the capacitor is a storage capacitor.

3. A display device comprising a display panel and a driving module electrically coupled with the display panel, wherein the display panel comprises a common voltage driving circuit, wherein the common voltage driving circuit comprises a plurality of scan lines and a plurality of common-voltage signal lines, and further comprises a plurality of common electrode units arranged in an array, wherein the plurality of scan lines extend in a first direction and are arranged at intervals in sequence in a second direction perpendicular to the first direction, the plurality of common-voltage signal lines extend in the second direction and are arranged at intervals in sequence in the first direction, the plurality of common electrode units are disposed at intersections of the plurality of scan lines and the plurality of common-voltage signal lines respectively, common electrode units in a same column are all electrically coupled with a same common-voltage signal line, common electrode units in a same row are all electrically coupled with a same second scan line, and the plurality of common electrode units are configured to independently control a common electrode voltage of a display device in units of sub-pixels;

the plurality of common electrode units each comprise a driving transistor, a capacitor, a reference electrode, and a common electrode, wherein the driving transistor has a gate for receiving a scan signal, a source for receiving a common voltage signal, and a drain electrically coupled with a first end of the capacitor and the common electrode, a second end of the capacitor is electrically coupled with the reference electrode, and the capacitor is configured to maintain a voltage of the common electrode; and the plurality of common electrode units each further comprise an insulating layer, a channel, and a passivation layer, wherein the insulating layer is stacked on a base substrate, and covers the gate and the reference electrode which are on the base substrate, the channel is disposed at one side of the insulating layer away from the gate of the driving transistor, a position of the channel corresponds to a position of the gate, and the passivation layer is stacked on the drain, the source, and the channel, and covers part of the insulating layer corresponding to the reference electrode.

4. The display device of claim 3, wherein the display panel further comprises a substrate, a Front Plane Laminate (FPL), and a support, the substrate is disposed at one side of the support, and the FPL is disposed at one side of the substrate away from the support, and the common voltage driving circuit is disposed at one side of the FPL away from the substrate.

5. The display device of claim 4, wherein the display panel further comprises a sealant, the sealant is disposed between the substrate and the common voltage driving circuit, the sealant, the substrate, and the common voltage driving circuit cooperatively define an accommodation space, and the FPL is in the accommodation space.

6. The display device of claim 4, wherein the FPL comprises a Thin Film Transistor (TFT) trace layer, a pixel electrode layer, and an electronic ink layer which are stacked in sequence, wherein the TFT trace layer is disposed at one side of the substrate away from the support, the pixel electrode layer is disposed at one side of the TFT trace layer away from the substrate, and the electronic ink layer is disposed at one side of the pixel electrode layer away from the TFT trace layer.

7. The display device of claim 4, wherein the driving module comprises a circuit driving board, a transmission board, and a driving unit, wherein the driving unit is disposed at one side of the substrate away from the support, the circuit driving board is electrically coupled with the driving unit through the transmission board, and the circuit driving board is configured to transmit a driving signal to the driving unit.

8. The display device of claim 6, wherein the pixel electrode layer is an Indium Tin Oxide (ITO) layer, and the electronic ink layer comprises a plurality of micro liquid capsules, and the plurality of micro liquid capsules each comprises a plurality of white particles, a plurality of black particles, and a transparent dispersion medium.

9. The display device of claim 3, wherein the driving transistor is a TFT, and the capacitor is a storage capacitor.

10. An electronic device comprising a power supply unit, a housing, and a display device, wherein the display device comprises a display panel and a driving module electrically coupled with the display panel, wherein the display panel comprises a common voltage driving circuit, wherein the common voltage driving circuit comprises a plurality of scan lines and a plurality of common-voltage signal lines, and further comprises a plurality of common electrode units arranged in an array, wherein the plurality of scan lines extend in a first direction and are arranged at intervals in sequence in a second direction perpendicular to the first direction, the plurality of common-voltage signal lines extend in the second direction and are arranged at intervals in sequence in the first direction, the plurality of common electrode units are disposed at intersections of the plurality of scan lines and the plurality of common-voltage signal lines respectively, common electrode units in a same column are all electrically coupled with a same common-voltage signal line, common electrode units in a same row are all electrically coupled with a same second scan line, and the plurality of common electrode units are configured to independently control a common electrode voltage of a display device in units of sub-pixels, wherein the power supply unit and the display device are mounted on the housing, the power supply unit is electrically coupled with the display device, and the power supply unit is configured to provide power for the display device;

the plurality of common electrode units each comprise a driving transistor, a capacitor, a reference electrode, and a common electrode, wherein the driving transistor has a gate for receiving a scan signal, a source for receiving a common voltage signal, and a drain electrically coupled with a first end of the capacitor and the common electrode, a second end of the capacitor is electrically coupled with the reference electrode, and the capacitor is configured to maintain a voltage of the common electrode; and the plurality of common electrode units each further comprise an insulating layer, a channel, and a passivation layer, wherein the insulating layer is stacked on a base substrate, and covers the gate and the reference electrode which are on the base substrate, the channel is disposed at one side of the insulating layer away from the gate of the driving transistor, a position of the channel corresponds to a position of the gate, and the passivation layer is stacked on the drain, the source, and the channel, and covers part of the insulating layer corresponding to the reference electrode.

11. The electronic device of claim 10, wherein the display panel further comprises a substrate, a Front Plane Laminate (FPL), and a support, the substrate is disposed at one side of the support, and the FPL is disposed at one side of the substrate away from the support, and the common voltage driving circuit is disposed at one side of the FPL away from the substrate.

12. The electronic device of claim 11, wherein the display panel further comprises a sealant, the sealant is disposed between the substrate and the common voltage driving circuit, the sealant, the substrate, and the common voltage driving circuit cooperatively define an accommodation space, and the FPL is in the accommodation space.

13. The electronic device of claim 11, wherein the FPL comprises a Thin Film Transistor (TFT) trace layer, a pixel electrode layer, and an electronic ink layer which are stacked in sequence, wherein the TFT trace layer is disposed at one side of the substrate away from the support, the pixel electrode layer is disposed at one side of the TFT trace layer away from the substrate, and the electronic ink layer is disposed at one side of the pixel electrode layer away from the TFT trace layer.

14. The electronic device of claim 11, wherein the driving module comprises a circuit driving board, a transmission board, and a driving unit, wherein the driving unit is disposed at one side of the substrate away from the support, the circuit driving board is electrically coupled with the driving unit through the transmission board, and the circuit driving board is configured to transmit a driving signal to the driving unit.

15. The electronic device of claim 13, wherein the pixel electrode layer is an Indium Tin Oxide (ITO) layer, and the electronic ink layer comprises a plurality of micro liquid capsules, and the plurality of micro liquid capsules each comprises a plurality of white particles, a plurality of black particles, and a transparent dispersion medium.

16. The electronic device of claim 10, wherein the driving transistor is a TFT, and the capacitor is a storage capacitor.

* * * * *